No. 787,323. PATENTED APR. 11, 1905.
C. E. BUSCHMANN.
BRAKE FOR WARP BEAMS.
APPLICATION FILED OCT. 21, 1903.
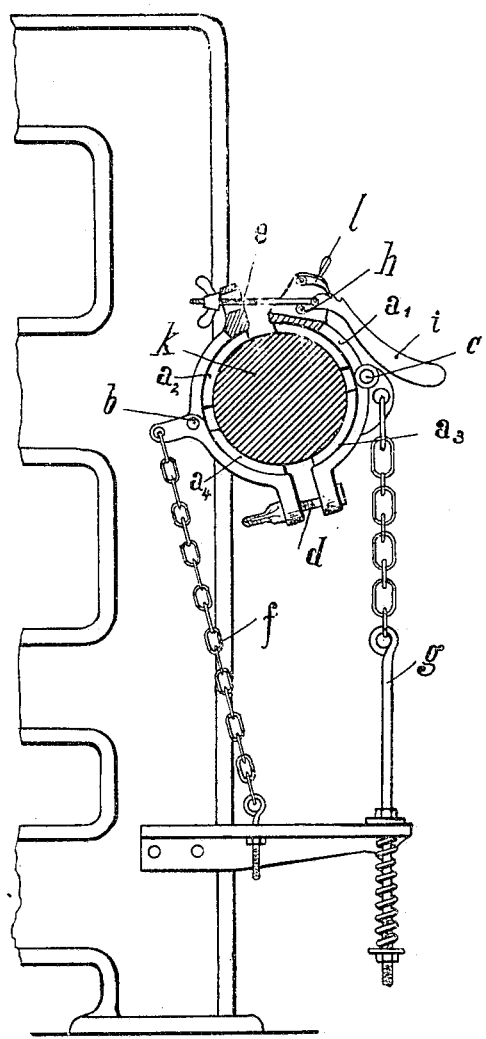

No. 787,323. Patented April 11, 1905.

UNITED STATES PATENT OFFICE.

CARL ERNST BUSCHMANN, OF GLAUCHAU, GERMANY.

BRAKE FOR WARP-BEAMS.

SPECIFICATION forming part of Letters Patent No. 787,323, dated April 11, 1905.

Application filed October 21, 1903. Serial No. 177,963.

*To all whom it may concern:*

Be it known that I, CARL ERNST BUSCHMANN, a subject of the Emperor of Germany, residing at Glauchau, in the Kingdom of Saxony, Germany, have invented certain new and useful Improvements in Brakes for Warp-Beams; and I hereby declare the following to be a full, clear, and exact description of my invention.

The object of my invention is a brake for warp-beams for use in looms and for the purpose to effect a smooth and uniform working of the brake, which can easily be applied to warp-beams of different diameters and can be used in different systems of looms, because its construction will admit an easy application or removal.

The novelty resides in the novel construction and combination of parts, as hereinafter more fully described and claimed.

As shown in the accompanying drawing, my brake consist of a ring-band composed of four parts $a'$ $a^2$ $a^3$ $a^4$, which are mounted with felt or other suitable material and are connected two by two through joints $b$ and $c$, which can be tightened or loosened by means of adjusting-screws $d$ and $e$. The brake-ring cannot participate in the revolution of the warp-beam $k$, being prevented from doing so by means of chains $f$ and $g$, the latter of which stands under the action of a spring. The adjusting-screw $e$ is arranged upon a lever $i$, which is pivoted at $h$ and secured upon the part $a'$, so as to enable a convenient loosening of the brake merely by lifting the latch $l$ from its engagement with the lever and to slacken the latter, which for this purpose is provided with several rests.

It can readily be seen by this construction that one workman alone can loosen the brake and turn the warp-beam without any effort and without untightening the adjusting-screws, as it had to be done in constructions known heretofore.

I claim—

1. A brake for warp-beams, comprising a ring-band composed of sections, each section in two hinged parts, means adjustably connecting the ends of the sections, and a lever pivoted upon one of the sections and connected with the means connecting the one end of said sections.

2. A brake for warp-beams, comprising a ring-band composed of sections, each section being in hinged parts, means adjustably connecting the ends of the sections, a lever pivoted on one of the parts of one of the sections and having a plurality of rests, and a latch pivoted on said section to engage the said rests.

3. A brake for warp-beams, comprising a ring-band in sections, each section composed of hinged parts, means adjustably connecting one end of said sections, an adjusting-screw connecting the other ends of said sections, a lever pivotally mounted on one of the sections and connected with said adjusting-screw and having a plurality of rests upon its outer face, a latch pivoted on said section to engage said rests, and chains connected at points on opposite sides of said band.

In testimony whereof I affix my signature.

CARL ERNST BUSCHMANN.

In presence of—
A. SCHRAMM,
M. L. CREEVEY.